United States Patent Office 3,613,256
Patented Oct. 19, 1971

3,613,256
APPARATUS FOR CONTACTING GASES WITH GRANULAR SOLID MATERIALS
Anatoly Ovseevich Belopolsky, Ulitsa Uritskogo 10a, kv. 37; and Jury Pavlovich Evdokimov, Ulitsa Griboedova 38, kv. 18, both of Dzerzhinsk, U.S.S.R.; Garald Lvovich Vexelman, Moskovskoe shosse 139, kv. 37, Gorky, U.S.S.R.; and Gennady Georgievich Nikolsky, Ulitsa Uritskogo 10a, kv. 41; and Vitaly Pavlovich Pchelin, Ulitsa Uritskogo 10a, kv. 10, both of Dzerzhinsk, U.S.S.R.
Filed Sept. 2, 1969, Ser. No. 854,694
Int. Cl. F27b 15/00
U.S. Cl. 34—57 A                                3 Claims

ABSTRACT OF THE DISCLOSURE

An apparatus for bringing gases in contact with granular solid materials, wherein in the granular solid material charging and discharging chambers there are provided means for allowing a granular solid material fluidizing agent to flow through them, thereby making it possible to attain uniform distribution of solid material particles and to ensure uniform discharge of the granular solid material from the apparatus. The charging chamber accommodates a cone-shaped baffle whose apex faces a connection provided for the charging of a granular solid material into the chamber. The baffle directs the stream of granular solid material from the charging connection to the peripheral zone of the charging connection to the peripheral zone of the charging chamber.

---

Figure 1:
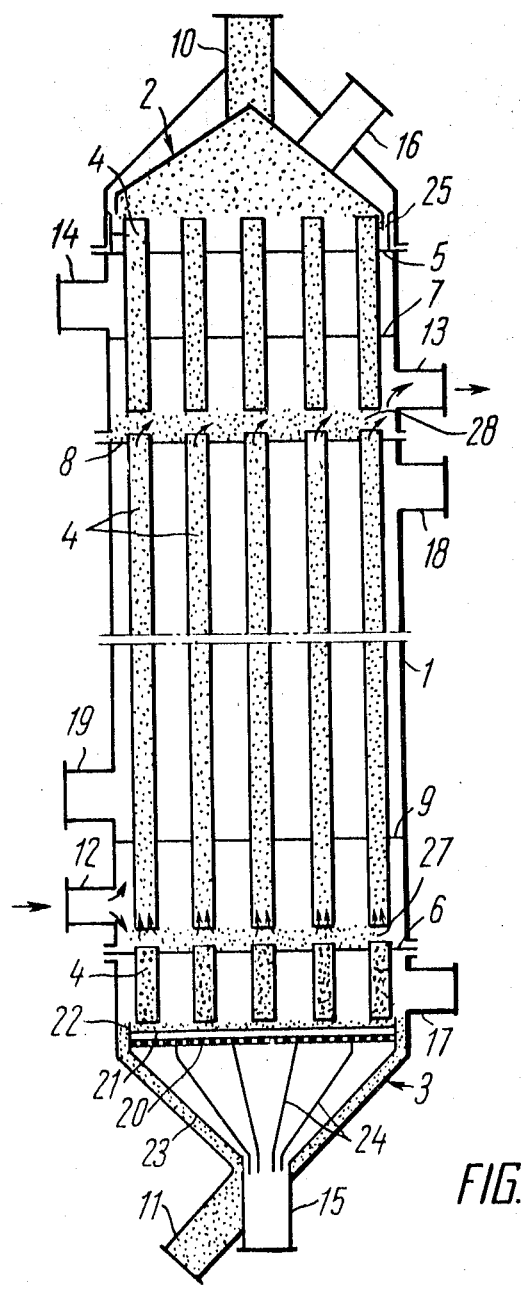

This invention relates to apparatus for carrying out diverse chemical and physical processes and, more specifically, is concerned with apparatus for effecting heterogeneous catalytic and adsorption processes by bringing gases in contact with granular solid materials.

There is known an apparatus for contacting gases with granular solid materials, which comprises a vertical cylindrical shell divided by a plurality of horizontal tube plates with solid granular material-containing vertical tubes mounted in said plates. In the top and bottom portions of the apparatus shell, the vertical tubes are made discontinuous, provision being made for intermediate tube plates to separate the zones where the tubes are discontinuous from the middle part of the apparatus. Disposed above the upper tube plate is a hollow chamber furnished with a central neck for charging the apparatus with granular solid materials, while under the bottom tube plate provision is made for a discharge chamber having a central port for discharging the granular solid material from the apparatus.

Disposed in the shell wall under the bottom tube plate is an inlet connection for gaseous reactants, whereas above the top tube plate provision is made for an outlet connection for discharging the gaseous products from the apparatus.

This apparatus may operate either continuously or batchwise.

Where the apparatus is operated batch-wise, the operating cycle commences with feeding a granular solid material into the apparatus through the central neck in the apparatus top and the charging chamber disposed below the central neck, whereupon the granular solid material descends by gravity and fills the vertical tubes in the apparatus. Then a gaseous reactant is fed into the apparatus via the bottom connection and ascends through the tubes, so that the gaseous reactant contacts continuously the granular solid material contained in said vertical tubes, the gaseous reaction products being discharged from the apparatus via the connection under the top tube plate.

Once the activity of the granular solid material is completely exhausted, gaseous reactant feed is discontinued, and the spent granular solid material is discharged from the apparatus, whereupon the operating cycle is repeated.

To operate the known apparatus continuously, the granular solid material is caused to continuously flow through the tubes and leave the apparatus, while feeding the gaseous reactant and discharging gaseous reaction products are likewise effected continuously, so that there takes place a countercurrent process of contacting the gases with the granular solid material.

However, in this apparatus, the granular solid material flows into and fills the tubes spontaneously by gravity, thereby excluding the possibility of attaining a uniform distribution of the granular solid material among the tubes as to height in each tube. This situation is responsible for the inequality of hydraulic resistance offered by different tubes as well as for hydraulic resistance variations within a tube and, hence, leads to process nonuniformity and incomplete utilization of the granular solid material.

It is feasible to attain in the known apparatus a higher degree of granular solid material utilization by subjecting said material to particle size classification and utilizing a material fraction containing particles of uniform size, but the aforesaid pretreatment of the granular solid materials involves additional expenses.

Moreover, where the known apparatus is operated continuously, the granular solid materials travel down the tubes at a nonuniform rate, so that the degree of solid material utilization in the course of the reaction is variable and a part of the granular solid material, which still retains its activity, leaves the apparatus.

It is the principal object of the present invention to provide an apparatus for contacting gases with granular solid materials which will make it possible to attain maximum uniformity of granular solid material particle distribution both among the apparatus tubes, also as to the height in each apparatus tube, as well as to control the process of charging and discharging the granular solid material, in order to ensure uniform reaction throughout the entire volume of the apparatus reaction zone and maximum utilization of the granular solid material.

This object is accomplished by the provision of an apparatus for contacting gases with granular solid materials in which the top part of the apparatus shell accommodates a chamber for charging the granular solid material into vertical reaction tubes secured in tube plates, and the bottom part of the apparatus houses a chamber for discharging the spent granular solid material, wherein, according to the invention, the charging chamber incorporates means for allowing a granular solid material fluidizing agent to transcend the charging chamber, the tube plates disposed in said charging chamber are perforated, and a porous partition is disposed in the space between the upper tube plate and tube ends protruding above said tube plate.

It is expedient to provide in the charging chamber a baffle intended for directing the stream of the granular solid material to the chamber periphery.

It is further preferable to provide in the discharging chamber means for allowing a granular solid material fluidizing agent to transcend the discharging chamber, and also to incorporate in said chamber a perforated plate and a porous partition secured above said plate, said porous partition and said perforated plate being disposed under the bottom ends of the vertical tubes.

The discharging chamber of the present apparatus may further be furnished with a diffuser having dividing partitions, said diffuser being disposed under said perforated plate of said discharging chamber.

Figure 2:
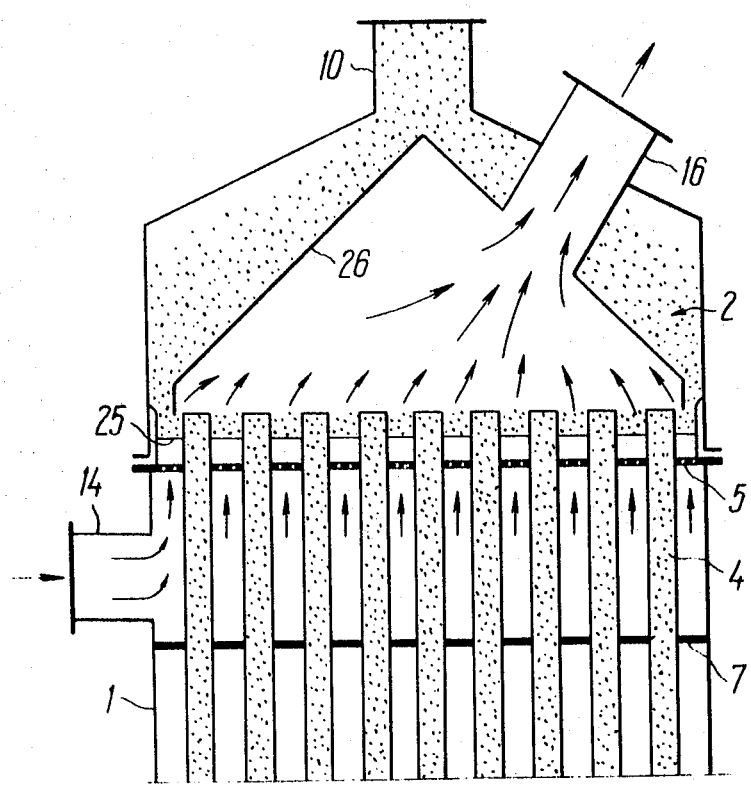

The invention is illustrated hereinbelow by the description of exemplary embodiments thereof as shown in the accompanying drawings, in which:

FIG. 1 presents a diagrammatic view of the apparatus for contacting gases with granular solid materials, according to the invention, and FIG. 2 shows on an enlarged scale a form of the charging chamber of the apparatus for contacting gases with granular solid materials, according to the invention.

The present apparatus for contacting gases with granular solid materials comprises a shell 1 (FIG. 1) whose upper part accommodates a charging chamber 2, while in the bottom part of the shell 1 provision is made for a discharging chamber 3. In the apparatus, vertical reaction tubes 4 are secured in a perforated upper tube plate 5, a bottom tube plate 6, and also in intermediate tube plates 7, 8 and 9. The apparatus shell 1 is furnished with a connection 10 for charging a granular solid material, a connection 11 for discharging said granular solid material from the apparatus, a connection 12 for gaseous reactant feed, a connection 13 for gaseous product outlet, fluidizing agent inlet connections 14 and 15, fluidizing agent outlet connections 16 and 17, a connection 18 for heat carrier feed into the inter-tube space of the apparatus, and a heat carrier outlet connection 19. In the discharging chamber 3 which is confined by the tube plate 6 and the apparatus bottom walls, provision is made for a perforated plate 20 disposed under the bottom ends of the tubes 4 and having a porous partition 21 secured above the perforated plate 20. Said perforated plate 20 is furnished on the periphery with a weir 22 that extends above the porous partition 21. Below the perforated plate 20, the discharging chamber 3 accommodates a diffuser 23 with dividing partitions 24.

The charging chamber 2, which is confined by the walls in the top part of the apparatus 1 and the tube plate 7, accommodates a porous partition 25 (FIGS. 1 and 2) disposed above the perforated tube plate 5.

Provision may be made under the granular solid material inlet connection 10 for a cone-shaped baffle 26 (FIG. 2) whose apex faces connection 10 and which is intended for directing the granular solid material to the periphery of the charging chamber 2.

The apparatus of the invention functions as follows.

Where the apparatus is operated batchwise, the process commences with feeding via the connection 10 into the charging chamber 2 (FIG. 1) a granular solid material which is retained on the porous partition 25 and penetrates, in part, into the tubes 4, or, in case the chamber 2 is furnished with the baffle 26 (FIG. 2), collects on the porous partition 25 in the peripheral part of the charging chamber 2.

An inert gas or some other fluidizing agent (arrows on FIG. 2 show the path of the fluidizing agent used) is then fed via the connection 14 (FIGS. 1, 2) under the perforated tube plate 5.

Granular solid material particles undergo fluidization above the porous partition 25 and are distributed over the entire surface of said partition. While being fluidized, the granular solid material also undergoes particle size classification and thereupon flows off the fluidized bed surface into the tubes 4, while the inert gas entrains dust particles from the granular solid material and leaves the charging chamber 2 via the outlet connection 16. The porous partition 21 (FIG. 1) disposed under the tubes 4 prevents the granular solid material from flowing out of said tubes.

On charging the apparatus with the granular solid material, a gaseous reactant fed via the connection 12, enters the tubes 4 through a gap 27 provided in said tubes and, while flowing upwards in said tubes contacts the granular solid material that has previously been charged into said tubes (shown in FIG. 1 by arrows is the path of the gaseous reactant in the apparatus). Gaseous reaction products emerge from the tubes 4 through gaps 28 provided therein and then leave the apparatus via the outlet connection 13. The connection 18 serves for feeding into the inter-tube space of the apparatus a heat carrier which next leaves the apparatus via the outlet connection 19.

When the reaction is terminated, as evidenced by the loss of granular solid material activity, gaseous reactant feed is stopped, and there commences the process of feeding a fluidizing agent via the inlet connection 15 disposed under the perforated plate 20 and the porous partition 21, so that the granular solid material particles under the bottom ends of the tubes 4 will be fluidized and caused to flow off the porous partition 21 over the weir 22 and into the discharge connection 11. The diffuser 23 makes it possible to attain uniform distribution of the fluidizing agent over the entire area of the porous partition 21, while the dividing partitions 24 in said diffuser provide for the uniformity of fluidizing agent distribution despite a relatively small length of the diffuser 23. Hence, it is feasible to attain on the porous partition 21 the utmost uniformity of granular solid material fluidization under all the tubes 4, said uniform distribution being conducive to causing the granular solid material particles to flow uniformly and simultaneously from the tubes 4 of the apparatus.

The granular solid material having been discharged from the apparatus, the process is repeated as disclosed herein before.

To carry out the process continuously, feeding the gaseous reactants into and discharging the gaseous reaction products from the apparatus are effected continuously, while the granular solid material is charged into and discharged from the apparatus periodically, an alternate mode of operating the apparatus continuously consisting in that, apart from continuously feeding the gaseous reactants into and discharging the gaseous reaction products from the apparatus, the granular solid material is likewise continuously charged into and discharged from the apparatus.

To effect either of the aforesaid continuous operation modes, it is preferred to provide for a uniform rate of granular solid material descent in all the tubes 4 of the apparatus. This goal is attained in the present apparatus by resorting to a combination of the charging chamber 2 which provides, as described here-in-before, for filling uniformly all the tubes 4 of the apparatus with the granular solid material, and the discharging chamber 3 which makes for discharging the granular solid material uniformly and simultaneously from all the tubes 4 of the apparatus, the afore said combination being conducive to carrying out the process uniformly throughout the entire volume of the apparatus reaction zone.

Hence, the present apparatus for contacting gases with granular solid materials makes it possible to intensify the process of contacting the reactants, provides for an enhanced efficiency due to the fact that the reaction is conducted uniformly in all the apparatus tubes, an added advantage being a reduced consumption of catalysts and other active materials required for carrying out diverse chemical processes.

While only certain preferred embodiments of the invention have been shown by way of illustration, many modifications and changes will occur to those skilled in the art. It is, therefore, to be understood that the appended claims are intended to cover all such modifications and changes as fall within the true spirit and scope of the invention.

We claim:

1. An apparatus for contacting gases with granular solid materials comprising: a shell including upper, middle and lower parts; vertical tubes disposed in said shell and extending from the lower part through the middle part to the upper part of the shell, said tubes having open upper and lower ends and being adapted for the passage therethrough of a granular solid material and a gas; said tubes being also provided with upper and lower openings in the middle part of the shell; tube plates disposed across said shell and supporting said vertical tubes in the shell, one of the tube plates separating the upper part of said shell from the middle part of said shell, at least part of said upper part being a charging chamber, one of the tube plates being the uppermost tube plate and being a perforated plate mounted in said charging chamber below the open upper ends of the tubes; a connection for charging a stream of granular solid material into said charging chamber; a porous partition adapted to retain said material and being disposed in said charging chamber between said perforated plate and the open upper tube ends; a cone-shaped baffle arranged in said charging chamber and having an apex which faces the said connection and being adapted to direct the stream of granular solid material to a peripheral zone of said charging chamber; means supplying a fluidizing agent to the upper part of the shell to pass upwardly through said charging chamber; another of the tube plates being the lowermost of said tube plates and separating the lower part of the shell from the middle part thereof; at least part of the lower part of said shell being a discharging chamber; means for feeding a gaseous reactant into said vertical tubes in the middle part of the shell; and means for discharging the gaseous reactant from said vertical tubes in the middle part of the shell.

2. An apparatus according to claim 1 comprising means for supplying a fluidizing agent to flow upwardly through the discharging chamber; a perforated tube plate disposed under said open bottom ends of the vertical tubes; a porous partition disposed under said open ends of the vertical tubes and over said perforated tube plate; and a connection for discharging the granular material from said discharging chamber.

3. An apparatus according to claim 2 comprising a diffuser including dividing partitions in said discharging chamber and disposed under said perforated plate.

References Cited

UNITED STATES PATENTS

| 2,684,124 | 7/1954 | Hines, Jr. | 34—57 AX |
| 3,372,734 | 3/1968 | Grubb et al. | 34—57 AX |

FOREIGN PATENTS

| 1,179,572 | 12/1958 | France | 34—57 A |

CHARLES J. MYHRE, Primary Examiner